Dec. 30, 1969 S. R. KLINGER ET AL 3,487,390

AUTOMATIC PROTECTIVE COVER FOR AN INTERCHANGEABLE DISC ASSEMBLY

Filed Nov. 25, 1966 4 Sheets-Sheet 1

INVENTORS
STEPHEN R. KLINGER
HERMAN A. DE NUNZIO
DEMOSTHENIS CHRYSSOPOULOS

BY Louis A. Kline
John J. Matlago
Robert L. Harrington
THEIR ATTORNEYS

AUTOMATIC PROTECTIVE COVER FOR AN INTERCHANGEABLE DISC ASSEMBLY

Filed Nov. 25, 1966 4 Sheets-Sheet 2

INVENTORS
STEPHEN R. KLINGER
HERMAN A. DE NUNZIO
DEMOSTHENIS CHRYSSOPOULOS

Louis A Kline
BY John J. Maclago
Robert L Harrington
THEIR ATTORNEYS

AUTOMATIC PROTECTIVE COVER FOR AN INTERCHANGEABLE DISC ASSEMBLY

Filed Nov. 25, 1966

INVENTORS
STEPHEN R. KLINGER
HERMAN A. DE NUNZIO
DEMOSTHENIS CHRYSSOPOULOS

BY

THEIR ATTORNEYS

AUTOMATIC PROTECTIVE COVER FOR AN INTERCHANGEABLE DISC ASSEMBLY

Filed Nov. 25, 1966 4 Sheets-Sheet 4

INVENTORS
STEPHEN R. KLINGER
HERMAN A. DE NUNZIO
DEMOSTHENIS CHRYSSOPOULOS

BY Louis A. Kline
John J. Matlago
Robert L. Harrington
THEIR ATTORNEYS

3,487,390
AUTOMATIC PROTECTIVE COVER FOR AN INTERCHANGEABLE DISC ASSEMBLY

Stephen R. Klinger, Los Angeles, Herman A. De Nunzio, Inglewood, and Demosthenis Chryssopoulos, Torrance, Calif., assignors to The National Cash Register, Company, Dayton, Ohio, a corporation of Maryland Filed Nov. 25, 1966, Ser. No. 597,156
Int. Cl. G11b *5/00;* G01d *9/00*
U.S. Cl. 340—174.1 9 Claims

ABSTRACT OF THE DISCLOSURE

A magnetic disc transducing apparatus comprising a housing having a driving means adapted to receive a disc pack that includes a plurality of spaced parallel magnetic coated discs enclosed within a removable storage cover. A protective hood is provided having a hinged connection to the housing. A storage cover removing assembly disposed within the housing has a linkage means connected to the protective hood. The linkage means operates in response to the opening and closing of the hood to automatically remove the storage cover from the disc pack as the hood is closed and to automatically replace the storage cover as the hood is opened.

This invention relates to magnetic storage systems employing interchangeable disc assemblies and more particularly to such systems where a mechanism associated with a magnetic transducing apparatus automatically removes a dust preventive storage cover from the disc assembly when the disc assembly is placed on the apparatus where it is protected from atmospheric dust by the apparatus housing, and which mechanism replaces the storage cover on the disc assembly prior to removal of the disc assembly from the protection of the housing.

Magnetic coated discs are commonly used in computerized systems for storing information. In such systems, the magnetic transducer heads employed to record and retrieve information from the discs are designed to ride on a very thin air bearing formed by the laminar flow of air clinging to the fast moving disc surface. The quality of the transducing operations is dependent on maintaining a very small spacing between the heads and the disc surface, e.g., in the order of a few micro inches. With such small spacing, even fine dust particles cannot be safely passed between the heads and recording surface and if a dust particle becomes lodged between the heads and the disc surface during a transducing operation, very serious damage can be done to either or both the heads and disc surface. Thus, it is very desirable to maintain the atmosphere immediately adjacent to the disc surfaces free of atmospheric dust.

Magnetic disc transducing apparatus used for recording information on and/or reading information off of the magnetic discs are therefore provided with protective hoods which enclose the discs and maintain the purity of the atmosphere surrounding the discs during the transducing operations. The transducing apparatus contemplated by the present invention are furthermore designed to perform the transducing operations on a large number of discs. The discs used in such contemplated apparatus are commonly assembled into disc units comprising, for example, three discs mounted in spaced coplanar relationship. One of the disc units may be placed in operative position under the hood of the transducing apparatus while a number of the units are stored on convenient shelves ready to be interchanged with the disc unit in the transducing apparatus. To protect the disc units that are in storage and thus not protected by the hood from atmospheric dust, dust proof storage covers are fitted over each of the disc units. A disc unit together with its storage cover is hereafter generally referred to as a disc pack.

The discs are thus protected both while in storage and while positioned in the transducing apparatus. However, a problem is encountered when the different disc packs are interchanged. In previous systems, when a disc pack was to be placed in the transducing apparatus, the storage cover was removed before the disc unit was enclosed within the protective hood. Conversely, when a disc unit was to be removed from the transducing apparatus, the hood was opened before the storage cover was placed over the disc unit. Thus, there was a period of time during the interchanging process when the discs were exposed to the atmosphere. Even the short exposure of the discs occurring during the interchanging process can be harmful and accordingly it is an object of the present invention to obviate such exposure during the interchanging process.

In general the preferred embodiment of the present invention comprises a disc pack having a transparent storage cover that is locked into position over a disc unit while the disc pack is in storage. Such prevents inadvertent removal of the cover and avoids undue exposure of the discs to the atmosphere. The disc pack (including the storage cover) is positioned under the hood of the transducing apparatus whereupon a mechanism of the apparatus automatically unlocks the cover to permit its removal from the disc unit. The protective hood of the transducing apparatus is adapted to enclose the disc pack with its storage cover in place and as the protective hood is closed, the storage cover is automatically raised off of the disc pack (by a mechanism of the transducing unit) to enable the transducer elements of the apparatus to be positioned for operation on the disc surfaces. Opening of the protective hood causes the disc pack storage cover to automatically return to its position over the discs and upon removal of the disc pack from its operative position on the transducing unit, the cover is again locked onto the disc unit. Thus, the only time that the storage cover is removed from the disc unit is while the disc pack is protected by the hood of the apparatus.

Because the storage cover is kept inside the protective hood during the time it is removed from the disc unit, the inside wall of the storage cover does not become exposed to the atmospheric dust. Such exposure could occur in prior devices where the cover was removed and placed outside the apparatus during the transducing operations. Any dust that would settle on the inside wall of the cover could transfer to the disc surface when the cover was subsequently placed back over the disc unit. Furthermore, in that the cover when removed is kept inside the protective hood and it is mechanically rather than manually removed and replaced on the disc unit, there is no chance for the generally unskilled operator to inadvertently mislay the cover or to simply forget to replace it back on the disc unit when his operation is completed The invention will be further understood by reference to the following detailed description and drawings wherein:

Figure 1:
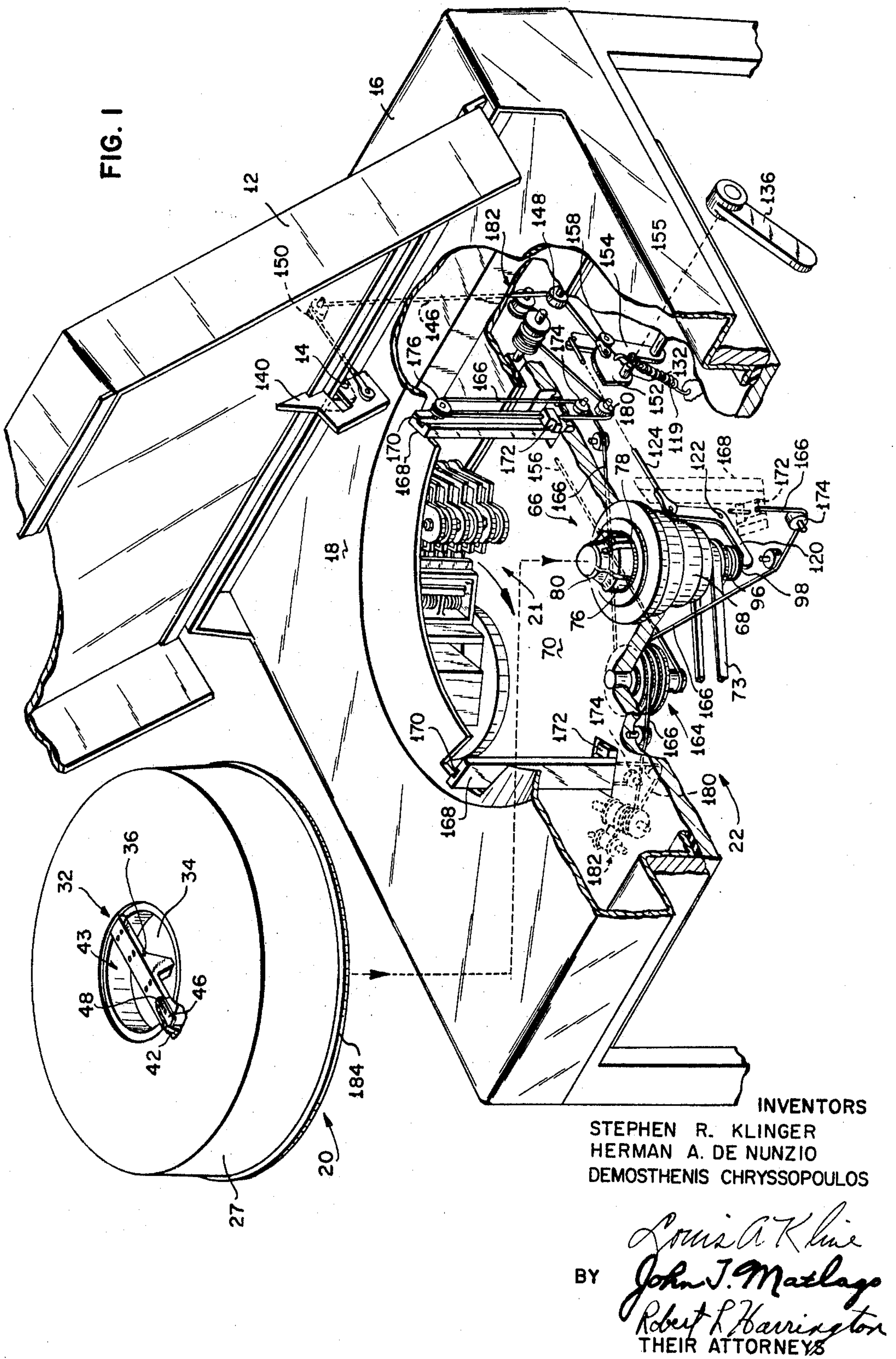
FIG. 1 is a perspective view of a magnetic disc transducing apparatus having portions removed for illustration of the present invention incorporated therein.

Referring to FIG. 1 of the drawings, a magnetic disc transducing apparatus 22 includes a protective hood 12 connected by pivotal connection 14 to a housing 16 that cooperates with the hood 12 to form a protective enclosure 18 for a disc pack 20. The transducing elements 21 (shown in FIG. 1 only) are suitable for performing the desired transducing operations on the surfaces of magnetic discs 24 as required for a computer system or the like. The transducing elements are pivotally mounted so that they can be swung out of the way to enable the disc pack to be placed in operative position in the transducing apparatus. Such suitable transducing elements are more specifically described in the commonly assigned copending application of Gerlach et al., Ser. No. 585,-674, filed Oct. 10, 1966.

The disc pack

Figure 2:
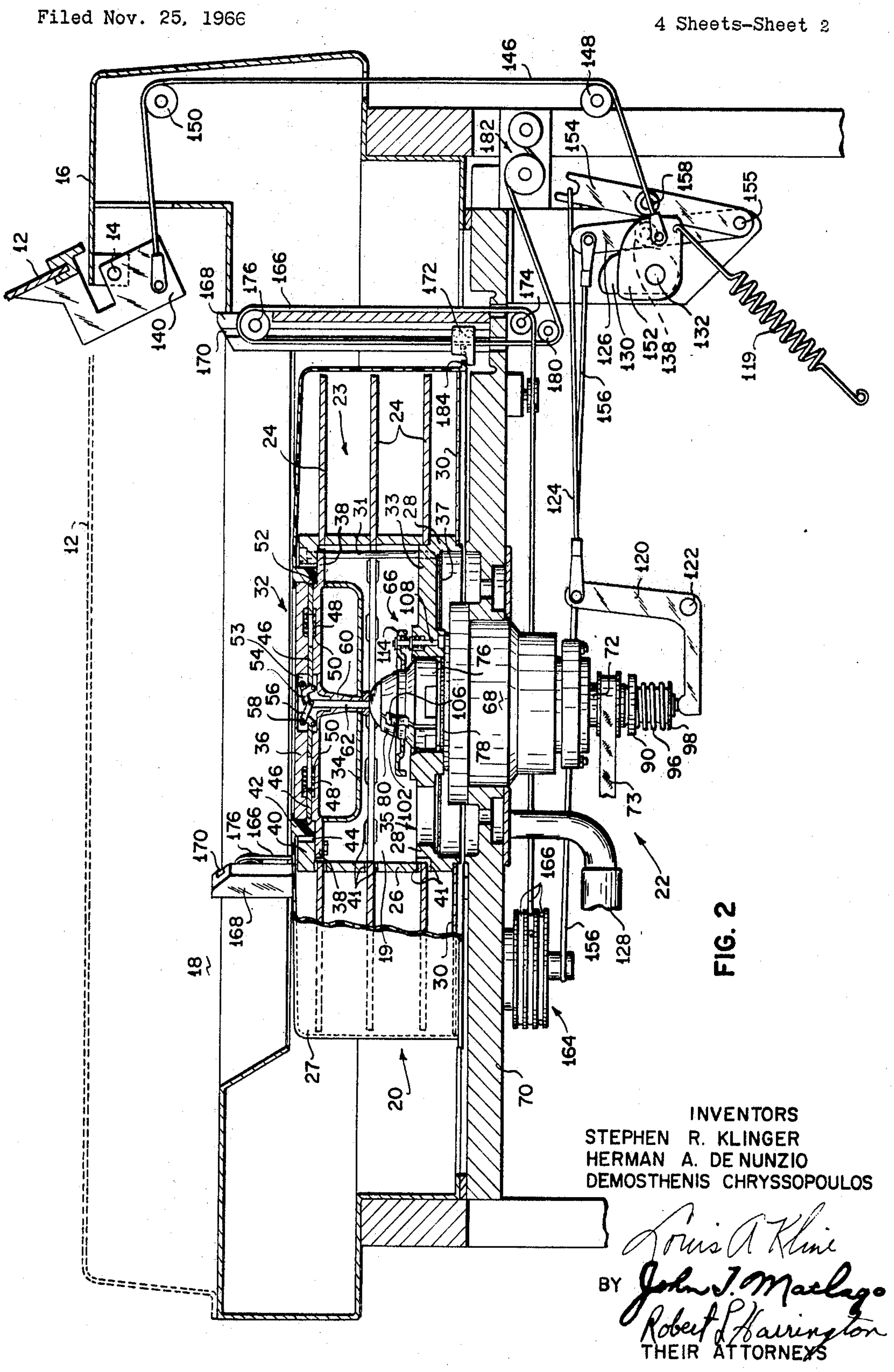
FIG. 2 is a sectional side view of the transducing apparatus of FIG. 1 with the transducing elements removed and with the additional showing of a disc pack placed on the drive mechanism of the unit.
Figure 3:
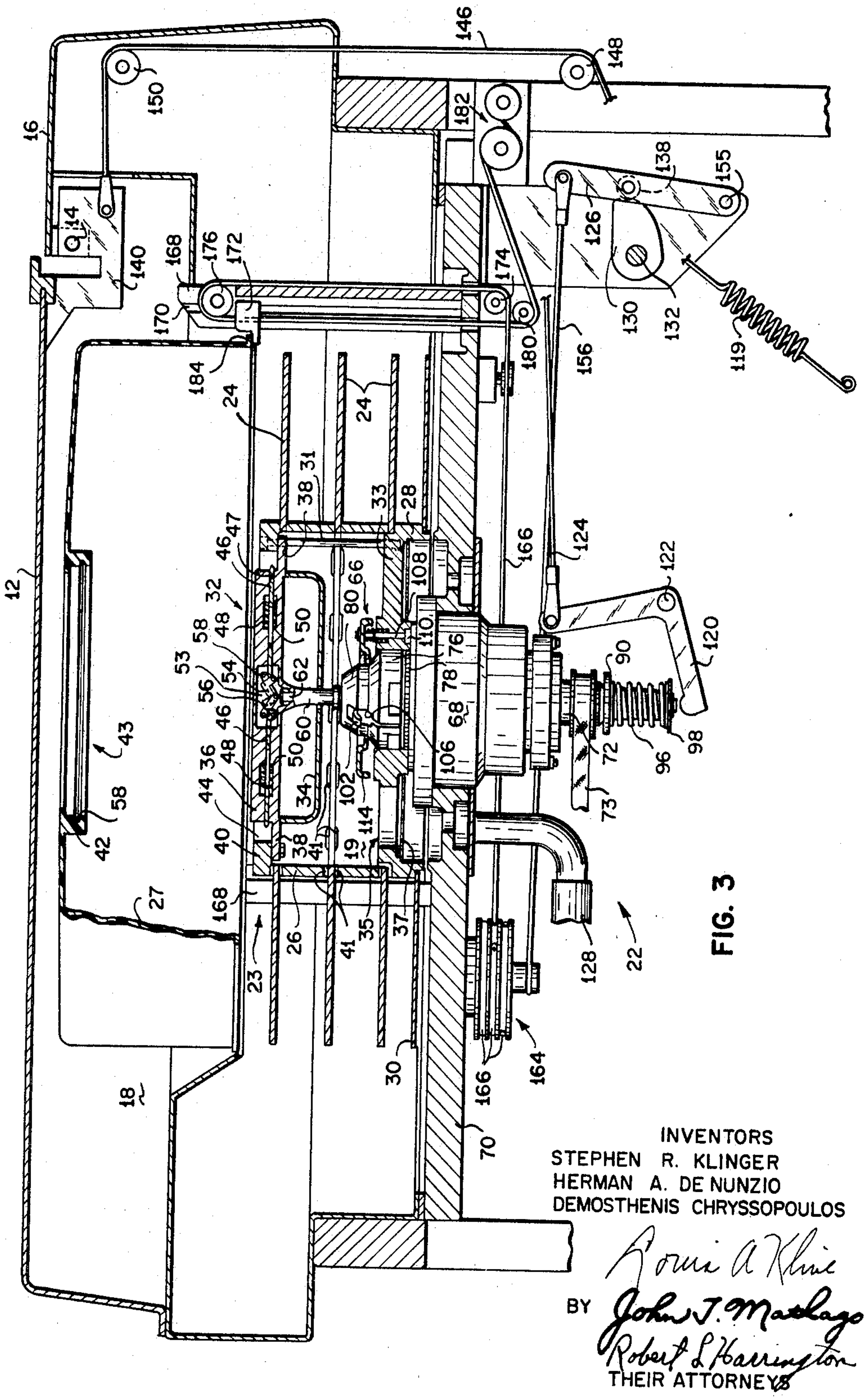
FIG. 3 is a sectional side view of the transducing apparatus as illustrated in FIG. 2 but modified to show the unit in position ready for a transducing operation.
Figure 4:
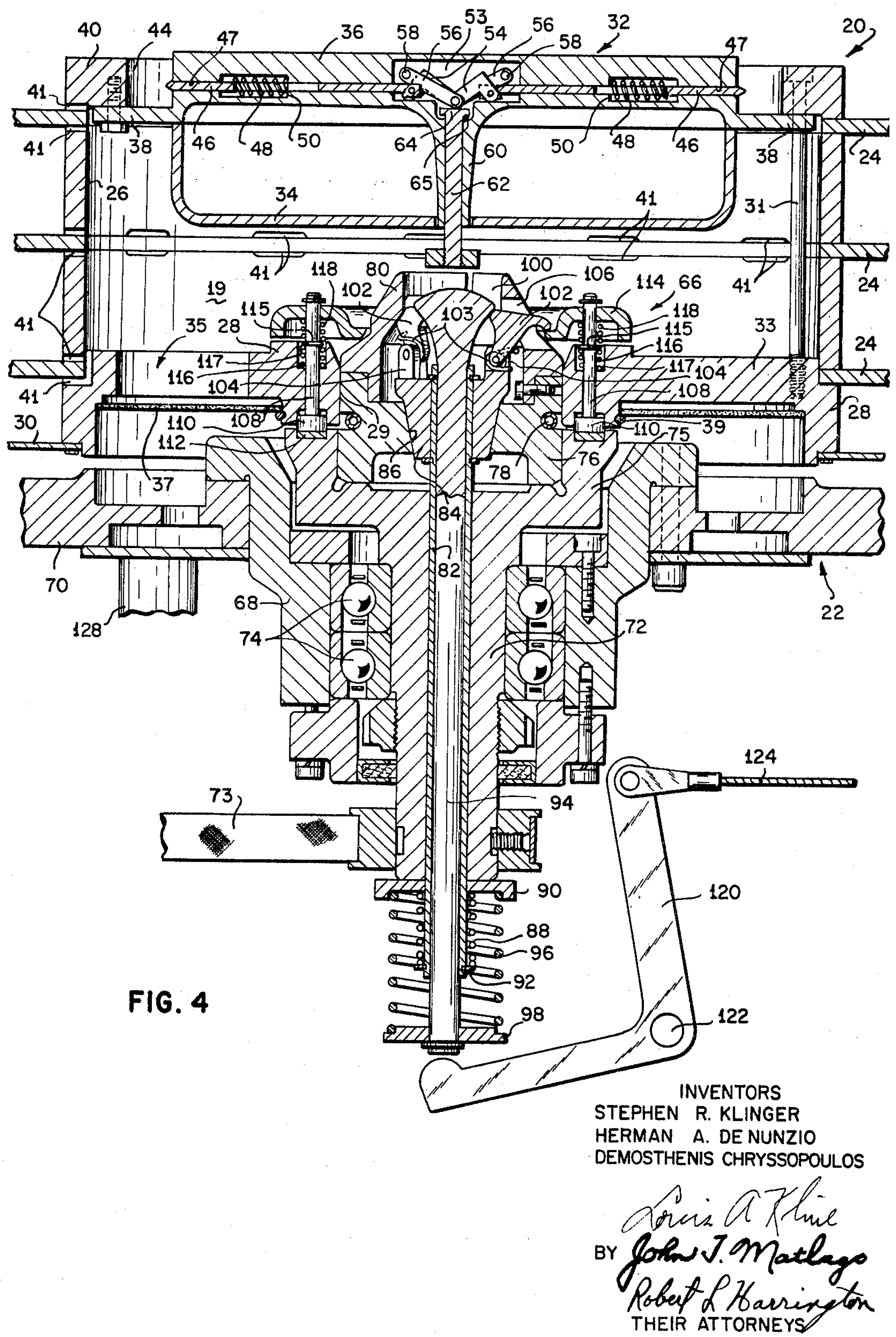
FIG. 4 is a sectional view of the drive mechanism of the transducing apparatus in position for the transducing operation as shown in FIG. 3.

The assembled disc pack 20 illustrated in FIG. 2 is shown in FIG. 3 to be comprised of a disc unit 23 and a storage cover 27. The disc unit 23 includes three discs 24 mounted together in spaced coplanar relationship. Referring to FIGS. 2, 3 and 4, cylindrical spacers 26 used for separating the discs 24 form a central chamber 19. A locking ring 40 at the top of the disc pack and a base member 28 at the bottom of the disc pack are fastened together by equally spaced bolt members 31 to lock the discs 24 and intermediate spacers 26 together. A protective disc-shaped plate 30 is mounted to the base 28. Plate 30 provides a bottom wall whose end seats against the storage cover 27 to define an enclosure for the disc unit 23 when the disc pack 20 is removed from the transducing apparatus, as shown in FIG. 1. The base 28 forming the bottom of chamber 19 has a web portion 33 provided with a central bore 29. As will be further explained hereafter, the central bore 29 is adapted to fit the disc unit 23 onto the drive assembly 66 of the transducing apparatus 22. A bearing ring 114 mounted through pins 108 to the inner edge of the central bore 29 of the base 28 is provided to hold the disc unit 23 to the drive assembly 66 of the transducing apparatus as also described in a later section. A disc-shaped filter 37, held by O-ring 39 (FIG. 4) covers portals 35 provided in the web portion 33 of the base 28 and thereby prevents dust particles from passing through portals 35 into the central chamber 19 of the disc unit. As shown in FIG. 2, portals 41 in the spacers 25 permit filtered air from portals 35 to be blown out portals 41 across the disc surfaces for further protection against the possibility of dust settling on the disc surfaces.

Referring particularly to FIG. 4, a handle insert member 32 is mounted in the upper end of the central chamber 19. The handle member 32 includes a cup-shaped lower wall 34 with a handle 36 mounted across the top of the cup-shaped wall (see also FIG. 1). Ear portions 38 extending from the handle 36 and from the upper edge of the cup-shaped wall 34 are bolted to the locking ring 40. The top of storage cover 27 is provided with a circular central opening 43 (see FIGS. 1 and 3) that permits access to the handle 36. A circular internal rib 42 depends from the edge of the cover opening 43 and is adapted to fit into a channel 44 that is formed around the handle insert member 32 and within the locking ring 40.

As shown in FIGS. 2–4, but most clearly in FIG. 4, a device is provided on handle 36 for locking the storage cover 27 to the disc pack. This device includes a pair of flat locking pins 46 (see also the break away portion of the disc pack illustrated in FIG. 1) mounted for slidable movement in a passage 47 extending through the handle 36. Compression springs 48 are abutted against shoulder portions 50 in the passage and are connected to the pins 46 to bias the pins into an extended position. In said extended position, with the cover 27 placed over the disc unit 23 as shown in FIG. 2, the pins protrude out of the passage and into a groove 52 on the circular internal rib 42 of the cover 27, whereby the cover is locked onto the disc unit 23.

As best seen in FIG. 4, the pins 46 extend inwardly within the handle 36 to a central cavity 53 where they are pivotally connected to one end of L-shaped linkages 54. The other ends of the L-shaped linkages are pivotally connected to the ends of bar linkages 56 whose other ends have fixed pivotal connections 58 to the handle grip 36. A hollow boss 60 depends from the handle 36 and through the bottom of the cup-shaped wall 34. A plunger 62 is positioned for free slidable movement within the boss 60. A head 64 on the upper end of plunger 62 (FIG. 4) is adapted to engage the interconnection between the linkages 54 and 56. The plunger 62 is limited in its downward movement by a reduction 65 in the opening of the boss 60 which does not permit passage of the head 64. When the plunger 62 is forced upward, it engages and pivots the linkages upwardly about the stationary pivots 58. As the bar linkages 56 are pivoted upwardly, the outer ends of the L-shaped linkages 54 are swung inwardly to draw the locking pins 46 inwardly against compression springs 48 for unlocking the storage cover 27 from the disc unit 23.

The drive assembly

As best seen in FIG. 4, the bottom central bore 29 of the disc unit 23 is positioned over guide 80 forming a part of drive assembly 66 of the transducing apparatus 22. As will be described in the following, the drive assembly includes a mechanism to move the plunger 62 into a raised position that unlocks the storage cover 27 from the disc unit 23, and a mechanism for firmly holding the disc unit onto the drive assembly 66 for rotative driving engagement thereby.

Referring to FIG. 4, the drive assembly 66 comprises a housing 68 that is mounted to a supporting wall 70 of the transducing apparatus 22. A hollow drive shaft 72 (driven by an endless belt 73 that is connected to a motor that is not shown) is rotatably mounted in the housing 68 on ball bearings 74. A flange portion 75 in the upper end of the drive shaft 72 houses an expandable member 76. The expandable member 76 is comprised of three separate but mated sections (see FIG. 1) that are held together by a resilient band 78. A guide 80 is also formed of three sections which are securely attached to the three corresponding sections of the expandable member 76.

A sleeve 82 is positioned for vertical slidable movement within the central bore of the hollow drive shaft 72. The lower end of the sleeve 82 extends below the lower end of the drive shaft and the upper end extends upwardly through a central opening in the expandable member 76. An inverted frustum collar 84 is affixed to the upper end of the sleeve 82. The inside wall that defines the opening in the expandable member 76 is tapered to form a bearing surface 86 for the frustum collar 84. The collar 84 is vertically moved up and down with the movement of the sleeve 82. Such movement forces an enlargement of the opening of the expandable member 76 to expand the expandable member when the collar 84 is in a down position. With the disc unit 23 placed over the drive assembly, the expandable member 76 thus expands within the central bore 29 defined by the web portion 33 of the base 28 of the disc unit 23. The disc unit 23 is thus precisely positioned for the desired transducing operations. Contraction of the expandable member 76 is induced by the resilient band 78 when the collar 84 is in an up position.

A compression spring 88 around the lower portion of the sleeve 82 extends between a flange 90 on the bottom edge of the drive shaft 72 and a retaining washer 92 connected to the lower end of the sleeve 82. The spring 88 functions to bias the sleeve into its down position whereby the collar 84 expands the opening of the expandable member 76.

A rod 94 has vertical sliding movement within the sleeve 82. The rod extends below the sleeve 82 and a compression spring 96 extends between the flange 90 on the bottom edge of the drive cylinder 72 and a flange 98 connected to the lower end of the rod 94 to bias the rod into a down position. The bell-shaped upper end of the rod 94 extends above the upper end of the sleeve 82 into a chamber 100 within the guide 80. Three toggle clamps 102 are pivotally connected to ear portions 104 carried by and equally spaced on the upper end of the collar 84. Springs 103 positioned at the pivotal connections of clamps 102 cause the inner end of clamp 102 to bear against the bell-shaped upper end of rod 94. The toggle clamps 102 are adapted to be pivoted outwardly through openings 106 in guide 80 by the bell-shaped end of the rod 94 when the rod is in a down position as shown in FIG. 4. When the rod 94 is forced into its up position, the toggle clamps are withdrawn into the guide 80 by the springs 103 (see in FIG. 4). The withdrawn position of the toggle clamps is shown in FIG. 2.

As also best seen in FIG. 4, friction driving movement of the disc unit 23 is provided by pressure pads 110 affixed to the lower end of pins 108, through which the bearing ring 114 is mounted to the web 33. The pressure pads 110 are adapted to engage a friction pad 112 attached to the rim of the flanged end portion 75 of the drive shaft 72. A retaining ring 115 is provided on the pins 108 and a compression spring 116 around the pin between a spring seating slot 117 of the base 28 and the retaining ring 115 biases the pins 108 upwardly. Compression springs 118 between the bearing ring 114 and the retaining ring 115 biases the pins 108 downwardly from the bearing ring.

Placing the disc pack 20 on the drive assembly 66 requires that the rod 94 and the sleeve 82 be in their upper position. Means are employed for forcing the rod 94 and sleeve 82 upward against the spring biased pressure of springs 88 and 96 as will be further explained hereafter. In such position the expandable member 76 is in the non-expanded position and the toggle clamps 102 are in a retracted position. When the disc pack is positioned on the drive assembly 66, with the rod 94 in its up position, the bell-shaped end thereof is adapted to abut against the plunger 62 of the disc pack handle insert member 32 to unlock the storage cover 27.

As will be explained hereafter, with the disc pack in place, the rod 94 and sleeve 82 are lowered. The toggle clamps 102 are pivotedly the bell-shaped portion of the rod 94 through openings 106 to clamp down on the bearing ring 114. The bearing ring 114 compresses spring 118 which increases the compressive force exerted on the retaining ring 115 of the drive pins 108 to force the pressure pads 110 into frictional driving engagement with the friction pad 112. Also, the frustum collar 84 carried by the sleeve 82 expands the expandable member 76 within the opening of the base 28 to insure a tight fit and precise centering of the disc pack.

The actuating mechanism

The rod 94 and sleeve 82 are forced into their up position by one end of an L-shaped arm 120 that has a fixed pivotal connection 122 to the housing of the transducing apparatus (see FIG. 4). As seen in FIG. 2, the other end of the L-shaped arm 120 is connected to one end of a cable 124 that has its other end connected to one end of a lever 154. The other end of the lever 154 has a pivotal connection 155 to the housing of the transducing apparatus. A first cam 152 is carried by a shaft 132 that is also pivotally mounted to the housing of the transducing apparatus. A cam follower 158 on the lever 154 is adapted to engage the cam 152. As the cam 152 is pivoted into a counterclockwise position as viewed in FIG. 2 (the means for pivoting cam 152 being explained hereafter), against the cam follower 158, the lever 154 is pivoted into its clockwise position and pulls the cable 124 and accordingly pivots the L-shaped arm 120 to initially force the rod 94 and then the sleeve 82 into their up position. Pivoting the cam 152 clockwise, i.e., away from the cam follower, allows the force from the spring biased sleeve and rod to return them to their down position.

A cable 146 is connected to a bracket 140 attached to the protective hood 12 and is directed therefrom over pulleys 150 and 148 to the cam 152. A lever 126 shown in FIGS. 2 and 3 has one end pivotally connected to the housing of the transducing apparatus with the other end connected to a cable 156. A cam follower 138 on the lever 126 is adapted to engage a second cam 130 to force clockwise pivotal movement of the lever 126 when cam 130 is pivoted clockwise by shaft 132. (See FIG. 3 where cam 152 and lever 154, shown in FIG. 2, have been removed for clarification.) A multiplier pulley assembly 164, pivotally connected to the supporting wall 70, has three large pulley sections that are connected to three cables 166 (all three of which are shown in FIG. 1). Cable 156 is connected to the smaller pulley section of the multiplier pulley 164 with cables 166 wrapped around the multiplier pulley 164 opposite to the direction that cable 156 is wrapped around pulley 164. Thus, as cable 156 is unwrapped from the multiplier pulley 164 by clockwise movement of the lever 154, due to the difference in the diameters of the respective pulley sections, four times as much of the cables 166 is wrapped onto the multiplier pulley 164.

Three vertically positioned guide arms 168 are symmetrically stationed around the positioned disc pack (two of which are shown in FIG. 1 and the position of the third being represented by a dotted outline). As best seen in FIGS. 2 and 3, each guide arm 168 has a vertical track 170 that accommodates a slide member 172. Each of the cables 166 extends from the multiplier pulley 164, around an idler pulley 174 and up and over a lifting pulley 176 connected to the top of guide arm 168. The lifting pulley 176 directs the cable down along the track 170 and through the slide member 172. A set screw fixes the slide member 172 to the cable 166 which continues around an idler pulley 180 beneath the guide arm for aligning the cable with the track 170. The cable then extends to a negator motor 182 which maintains a desired tension on the cables 166. Thus, as cables 166 are wrapped around the multiplier pulley 164 the cables 166 are pulled from the take up roller of the negator motor 182 around the pulleys 180, 176 and 174 to run the slide member 172 up the track 170.

Each slide member 172 includes a finger portion that is adapted to engage a rim 184 on the outside of the disc pack storage cover 27. Thus, as the three slide members 172 are simultaneously moved up their respective guide arms 168, the rim 184 of the storage cover is engaged at three symmetrical points to raise the cover along with the slides.

Operation

In an initial position as shown in FIG. 1, the protective hood 12 is raised and disc pack 20 is ready to be placed on the drive assembly 66. In this position, lever 154 is pivoted to its clockwise position by cam 152. The L-shaped arm 120 is pivoted to its clockwise position and sleeve 82 and rod 94 are forced into their up position where expandable member 76 is in its non-expanded position and toggle clamps 102 are withdrawn into the guide chamber 100 of guide 80.

Lever 126 is pivoted into its counterclockwise position by cam 130 so that cable 156 is wound onto the multiplier pulley 164 and cables 166 are unwound therefrom to position the slides 172 into their down position. When the disc pack 20 is placed on the drive assembly 66, as shown in FIG. 2, plunger 62 within the disc pack handle is forced upwardly by the head of rod 94 and locking pins 46 are withdrawn to unlock the cover 27 from the disc pack.

When the protective hood 12 is manually closed as shown in FIG. 3, cable 146 is relaxed and cams 130 and 152 are spring biased by spring 119 (acting directly on cam 152 which causes pivoting of shaft 132 and accordingly cam 130) into their clockwise position causing lever 154 to pivot counterclockwise and lever 126 to pivot clockwise. Cable 156 is thus unwound from the multiplier pulley 164 causing cables 166 to be wound thereon. Slides 172 are raised on guide arms 168 and the slides engage rim 184 of the storage cover 27 to raise the cover off the disc pack 20.

Cable 124 connected to lever 154 is relaxed, permitting compression springs 88 and 96 to force the sleeve 82 and rod 94 into their down position. Toggle clamps 102 are thus pivoted out of guide 80 to clamp the pressure pads 110 of pins 108 down onto the friction pad 112 of the drive shaft for driven rotative movement thereby. Expandable member 76 is expanded for precise centering of the disc pack, and the disc pack is then ready for the desired transducing operations by the transducing elements 21.

Other features that are desirable for the illustrated embodiment include an air hose 128 (FIGS. 2–4) for directing a flow of filtered air through the portals 35 of the supporting wall 70 to be then directed into chamber 19 and blown out portals 41 across the disc surfaces. A second desirable feature is the provision of a handle 136 located outside the apparatus housing and connected to the shaft 132 as shown in FIG. 1. The clamping mechanism and cover lifting mechanism can be operated by handle 136 when the hood is disconnected from the cable 146. Such is desirable, for example, to facilitate repairing of the mechanism. It may also be desirable to provide a removable bottom cover for the disc pack to provide additional protection for the disc unit and thereby prevent unfiltered air from getting into the storage cover through the uncovered bore 29 of the base 28.

While there have been shown, described and pointed out the fundamental novel features of the invention, as applied to the preferred embodiments, it will be understood that various omissions, substitutions and changes in the form and details of the device illustrated and in its operation may be made by those skilled in the art, without departing from the scope and spirit of the invention. It is the intention, therefore, to be limited only as indicated by the following claims.

What is claimed is:

1. A magnetic disc transducting apparatus for use in magnetic data storage systems comprising: a housing; a disc pack including a magnetic coated disc and an enclosing storage cover; means within said housing for receiving said disc pack; transducing elements within said housing; a protective hood having a hinged connection to the housing whereby the protective hood can be opened for the disc pack to be positioned in the housing and then closed over the disc pack to protect the disc from atmospheric dust during a transducing operation; a mechanism within the housing for removing the storage cover from the disc to permit the transducing elements to be positioned for operation relative to the magnetic surface of the disc; and linkage means interconnecting the protective hood and said mechanism whereby said mechanism is responsive to the opening and closing of the hood for removing the storage cover as the hood is closed, and for replacing the storage cover as the hood is opened.

2. A magnetic disc transducing apparatus for use in magnetic data storage systems as defined in claim 1 wherein: the mechanism for removing the storage cover includes at least three guide arms symmetrically positioned around the periphery of a positioned disc pack, a slide mounted on each guide arm for vertical sliding movement thereon, said slides being adapted to engage the storage cover of the disc pack and, by simultaneous movement of the slides up and down on their respective guide arms, to cooperatively lift the cover off and replace the cover over the disc unit of the disc pack, a lifting cable for each guide arm, each lifting cable having one end connected to a pulley assembly that is rotatably mounted to the housing, guide means forming a pathway for each lifting cable adjacent and parallel to the respective guide arm, and take up means at the end of the pathway for taking up and letting out the cable to move the cable back and forth along the pathway as controlled by the rotative movement of the pulley assembly, said linkage means connecting the protective hood to the pulley assembly for rotating the pulley assembly as the hood is raised and lowered whereby said lifting cables are wound onto and off of said pulley assembly, and means connecting each slide to the corresponding lifting cable to cause said slide to move up and down the guide arm with the cable.

3. A magnetic disc transducing apparatus for use in magnetic data storage systems as defined in claim 2 wherein: said linkage means includes a lever having one end pivotally connected to the housing, a first linkage cable having one end connected to the free end of the lever and the other end connected to the pulley assembly, a cam pivotally mounted to the housing and a cam follower on the lever engaging the cam when the cam is pivoted for imparting pivotal movement to the lever, and a second linkage cable having one end connected to the protective hood and the other end to the cam whereby when the hood is opened the second linkage cable is pulled to pivot the cam and lever and thereby unwind the first linkage cable from the pulley assembly and wind the lifting cables thereon.

4. A magnetic disc transducing apparatus for use in magnetic data storage systems as defined in claim 1 including: a drive assembly within the housing for engaging and imparting rotative movement to a magnetic coated disc that is positioned in the housing, said drive assembly including a drive shaft and clamping means for clamping a disc to the drive shaft, means interconnecting said clamping means with said linkage means to activate said clamping means in response to the closing of the protective hood and to release said clamping means in response to the opening of the protective hood.

5. A magnetic disc transducing apparatus for use in magnetic data storage systems as defined in claim 4 wherein: said clamping means includes a cylindrical sleeve having vertical sliding movement within the drive shaft, an inverted frustum collar carried on the upper end of the sleeve, an expandable member carried by the drive shaft adapted to be seated within the central opening of a positioned disc and for expanding therewithin to frictionally grip and centrally position the disc on the drive assembly, said expandable member having a bearing surface that engages the frustum collar whereby positioning the sleeve in a down position causes expansion of the expandable member; a rod having vertical sliding movement within the sleeve with a bell-shaped head portion protruding above the sleeve, toggle clamps pivotally mounted to the drive assembly adapted for engagement by said bell-shaped head portion to clamp down against a positioned disc pack when the rod is in a down position, a first spring biasing means biasing the sleeve into its down position, and a second spring biasing means biasing the rod into its down position, a disc assembly release bar pivotally connected to the housing adapted to pivot against the rod and sleeve to force said rod and sleeve against the first and second spring biasing means to permit the toggle clamps and expandable member to release the positioned disc assembly, a release cable interconnecting said release bar with said linkage means whereby opening of the protective hood produces movement of the pressure bar against the spring biased forces of the rod and sleeve.

6. A magnetic disc transducing apparatus for use in magnetic data storage systems comprising a housing having means for receiving a disc pack that includes a magnetic coated disc enclosed within a storage cover; a protective hood for enclosing a disc pack that is positioned within the housing; a mechanism within the housing for removing the storage cover from the disc while the disc pack is enclosed within the protective hood, said mechanism including at least three guide arms symmetrically positioned around the periphery of a positioned disc pack, a slide mounted on each guide arm for vertical sliding movement thereon, said slides being adapted to engage the storage cover of the disc pack, and, by simultaneous movement of the slides up and down on their respective guide arms, to cooperatively lift the cover off and replace the cover over the disc unit of the disc pack, a lifting cable for each guide arm, each lifting cable having one end connected to a pulley assembly that is rotatably mounted to the housing, guide means forming a pathway for each lifting cable adjacent and parallel to the respective guide arm, and take up means at the end of the pathway for taking up and letting out the cable to move the cable back and forth along the pathway as controlled by the rotative movement of the pulley assembly, and means for rotating the pulley assembly to wind the lifting cables onto and off of said pulley assembly, and means connecting each slide to the corresponding lifting cable to cause said slide to move up and down the guide arm with the lifting cable.

7. A magnetic disc transducing apparatus comprising a housing having a protective hood hingedly connected thereto, a magnetic disc pack having a removable storage cover thereon, said housing being adapted to receive said disc pack, an automatic storage cover removing assembly disposed within the housing and comprising linkage means connected to the protective hood and adapted to remove the storage cover from the disc pack as the hood is closed and to replace the storage cover as the hood is opened.

8. A magnetic disc transducing apparatus comprising a magnetic disc pack including a plurality of spaced parallel magnetic coated discs connected to form a disc unit and a removable storage cover positioned over the disc unit to protect the unit from atmospheric dust, a housing having a protective hood hingedly connected thereto, said housing being adapted to receive said magnetic disc pack, a locking assembly for said magnetic disc pack capable of locking the storage cover to the disc unit, and an unlocking assembly adapted to unlock the cover from the disc unit in response to the placing of the disc pack into an operative position in the transducing apparatus, said transducing apparatus including a storage cover removing assembly disposed within the housing and having linkage means connected to the protective hood and responsive to the opening and closing of the hood to remove the storage cover from the disc pack as the hood is closed and to replace the storage cover as the hood is opened.

9. A magnetic recording disc transducing apparatus, including a transducing unit, a magnetic disc pack comprising at least one magnetic recording disc and an enclosing cover, a housing in the transducing unit adapted to receive the magnetic disc pack, a protective hood hinged to said housing so as to be opened to permit insertion and withdrawal of the disc pack, and closed to protect the inserted disc pack and transducing unit, and a control mechanism so assocated with the protective hood and the cover that, as the hood is closed, said control mechanism automatically removes the cover from the inserted disc pack to permit said magnetic disc to be operatively associated with the transducing unit, and, as said hood is opened, said control mechanism automatically replaces the cover on the inserted disc pack.

References Cited

UNITED STATES PATENTS

| | | | |
|---|---|---|---|
| 3,176,281 | 3/1965 | Pattison | 346—145 |
| 3,206,214 | 9/1965 | Leary | 274—39 |
| 3,390,398 | 6/1968 | Neff | 346—68 |

FOREIGN PATENTS

| | | |
|---|---|---|
| 744,638 | 2/1956 | Great Britain. |

BERNARD KONICK, Primary Examiner

J. I. ROSENBLATT, Assistant Examiner

U.S. Cl. X.R.

274—2; 346—68